US011958705B2

(12) United States Patent
Han (10) Patent No.: US 11,958,705 B2
(45) Date of Patent: Apr. 16, 2024

(54) APPARATUS FOR LOADING AND UNLOADING ROLL

(71) Applicant: SK On Co., Ltd., Seoul (KR)

(72) Inventor: Sang Dock Han, Daejeon (KR)

(73) Assignee: SK ON CO., LTD., Seoul (KR)

( * ) Notice: Subject to any disclaimer, the term of this patent is extended or adjusted under 35 U.S.C. 154(b) by 28 days.

(21) Appl. No.: 17/955,776

(22) Filed: Sep. 29, 2022

(65) Prior Publication Data

US 2023/0100417 A1 Mar. 30, 2023

(30) Foreign Application Priority Data

Sep. 29, 2021 (KR) ................. 10-2021-0128768

(51) Int. Cl.
*B65H 19/12* (2006.01)
*B65H 16/06* (2006.01)

(52) U.S. Cl.
CPC ........... *B65H 19/123* (2013.01); *B65H 16/06* (2013.01); *B65G 2201/0232* (2013.01); *B65H 2301/41734* (2013.01); *B65H 2402/40* (2013.01); *B65H 2408/24* (2013.01)

(58) Field of Classification Search
CPC .............. B65H 19/126; B65H 16/06; B65H 2301/41734; B65H 2402/40; B65H 2301/4175; B65H 19/123; B65H 19/12
See application file for complete search history.

(56) References Cited

U.S. PATENT DOCUMENTS

| 5,209,247 | A | * | 5/1993 | Rittershaus | .......... | B65H 19/123 131/58 |
| 5,674,049 | A | * | 10/1997 | Pienta | .................. | B65H 19/123 414/679 |
| 6,978,964 | B2 | * | 12/2005 | Beccari | .................. | B65H 16/10 414/277 |
| 8,322,646 | B2 | * | 12/2012 | Ueyama | ............... | B65H 19/223 242/559.4 |
| 11,325,801 | B2 | * | 5/2022 | Follen | .................. | B65H 19/123 |
| 11,383,948 | B2 | * | 7/2022 | Montoya | ............... | B65H 23/182 |
| 2010/0025516 | A1 | * | 2/2010 | Barsacchi | ............ | B65H 19/123 294/188 |

(Continued)

FOREIGN PATENT DOCUMENTS

| KR | 10-2190264 B1 | 12/2020 |
| KR | 10-2194624 B1 | 12/2020 |
| KR | 10-2021-0028381 A | 3/2021 |

OTHER PUBLICATIONS

Extended European Search Report for the European Patent Application No. 22198547.6 issued by the European Patent Office dated Feb. 13, 2023.

*Primary Examiner* — William A. Rivera
(74) *Attorney, Agent, or Firm* — IP & T GROUP LLP (57) ABSTRACT

An apparatus for loading and unloading a roll includes a roll support portion disposed adjacent to a roll unwinder; a first traveling rail disposed on one side of the roll unwinder; a moving frame movably installed on the first traveling rail; and a roll attaching and detaching unit movably installed on the moving frame, wherein the roll support portion includes a lifting unit configured to move up and down a disposed roll, and wherein the roll attaching and detaching unit includes a moving plate moving on the moving frame, and a main body portion rotatably installed on the moving plate.

13 Claims, 8 Drawing Sheets

(56) References Cited

U.S. PATENT DOCUMENTS

| | | | |
|---|---|---|---|
| 2016/0060059 A1* | 3/2016 | Macura | B65H 19/123 |
| | | | 242/555.1 |
| 2017/0327336 A1* | 11/2017 | Vergentini | B65H 19/12 |
| 2018/0141772 A1* | 5/2018 | Prankl | B65H 19/12 |
| 2019/0337747 A1 | 11/2019 | Nagafuchi et al. | |
| 2022/0009730 A1* | 1/2022 | Korcusko | B66F 3/24 |
| 2023/0158787 A1* | 5/2023 | Monfredini | B32B 37/223 |
| | | | 428/537.5 |

* cited by examiner

APPARATUS FOR LOADING AND UNLOADING ROLL

CROSS-REFERENCE TO RELATED APPLICATIONS

This application claims benefit of priority to Korean Patent Application No. 10-2021-0128768 filed on Sep. 29, 2021 in the Korean Intellectual Property Office, the disclosure of which is incorporated herein by reference in its entirety.

BACKGROUND

1. Field

The present disclosure relates to an apparatus for loading and unloading a roll.

2. Description of Related Art

Generally, a secondary battery may be used repeatedly through a discharging process converting chemical energy into electrical energy and a charging process in a reverse direction thereof, and a secondary battery may include a nickel-cadmium (Ni—Cd) battery, a nickel-hydrogen (Ni-MH) battery, a lithium-metal battery, a lithium-ion (Ni-Ion) battery and a lithium-ion (Ni-Ion) polymer battery.

In an electrode process in a process of manufacturing a secondary battery, an operator may input a jumbo roll to and discharge a jumbo roll from process equipment.

When a roll needs to be replaced by an operator, material defects and operator accidents may occur as the roll falls.

SUMMARY

An aspect of the present disclosure is to provide an apparatus for loading and unloading a roll without an operator.

An aspect of the present disclosure is to provide an apparatus for loading and unloading a roll which may prevent material defects and operator accidents caused by a roll falling.

According to an aspect of the present disclosure, an apparatus for loading and unloading a roll includes a roll support portion disposed adjacent to a roll unwinder; a first traveling rail disposed on one side of the roll unwinder; a moving frame movably installed on the first traveling rail; and a roll attaching and detaching unit movably installed on the moving frame, wherein the roll support portion includes a lifting unit configured to move up and down a disposed roll, and wherein the roll attaching and detaching unit includes a moving plate moving on the moving frame, and a main body portion rotatably installed on the moving plate.

The roll support portion may include a support frame extending upwardly from a bottom surface and a guide member installed on the support frame, and the lifting unit is connected to the guide member.

The lifting unit may include a lifting arm installed on the lifting arm to move up and down on the guide member, and a lifting driving source installed on the lifting arm and providing driving force to move up and down along the guide member.

The lifting arm may include a clamp movably installed for clamping of the roll.

The first traveling rail may be disposed side by side with the roll unwinder.

A plurality of the roll unwinders may be spaced apart from each other along the first traveling rail.

The moving frame may include a first driving source connected to the first traveling rail such that the moving frame may be able to move along the first traveling rail.

The moving frame may be disposed to intersect the first traveling rail.

The moving plate may include a second driving source connected to the moving frame so as to be able to move along the moving frame.

The main body portion may include a rotating plate rotatably installed on the moving plate, a support stand extending upwardly from the rotating plate, a detachable fork installed on the support stand to move up and down, and a fork driving source connected to the detachable fork and moving up and down the detachable fork.

The apparatus may further include an automatic conveying carrier for moving the roll.

The automatic conveying carrier may include a seating stand for loading the roll on an upper surface thereof.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

These embodiments are described in sufficient detail to enable those skilled in the art to practice the invention. It is to be understood that the various embodiments of the invention, although different, are not necessarily mutually exclusive. For example, structures, shapes, and sizes described as examples in embodiments in the present disclosure may be implemented in another example embodiment without departing from the spirit and scope of the present disclosure. Further, modifications of positions or arrangements of elements in example embodiments may be made without departing from the spirit and scope of the present disclosure. The following detailed description is, accordingly, not to be taken in a limiting sense, and the scope of the present disclosure are defined only by appended claims, appropriately interpreted, along with the full range of equivalents to which the claims are entitled.

Figure 1:
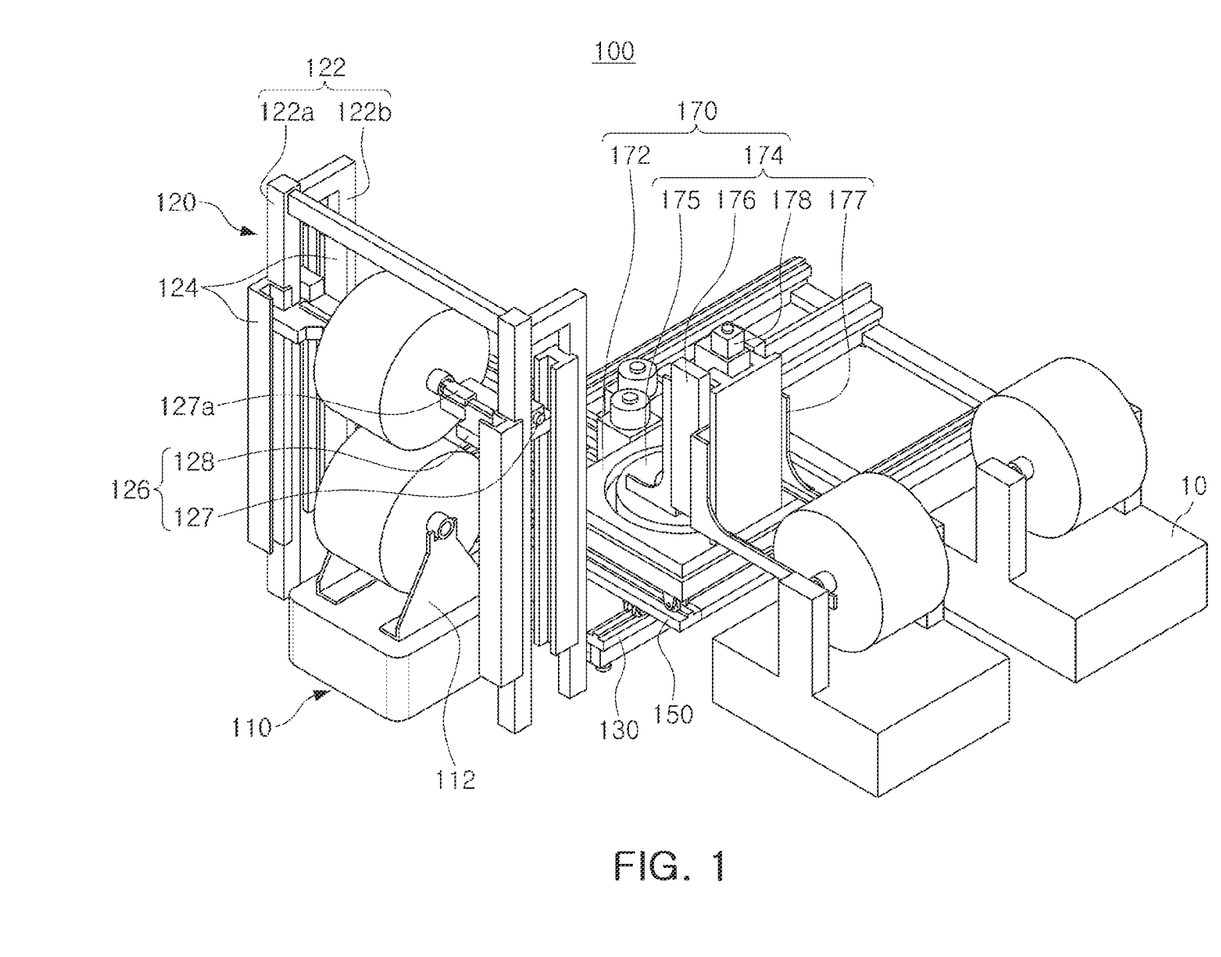
FIG. 1 is a perspective diagram illustrating an apparatus for loading and unloading a roll according to an example embodiment of the present disclosure.

FIG. 1 is a perspective diagram illustrating an apparatus for loading and unloading a roll according to an example embodiment.

Referring to FIG. 1, an apparatus 100 for loading and unloading a roll according to an example embodiment may include, for example, an automatic conveying carrier 110, a roll support portion 120, a first traveling rail 130, a moving frame 150 and a roll attaching and detaching unit 170.

The automatic conveying carrier 110 may load a new roll stored in a warehouse onto the roll unwinder 10 and may load a used roll from the roll unwinder 10 in the warehouse. The roll is seated on a seating stand 112. The automatic conveying carrier 110 may be connected to a control unit and may repeatedly move between the warehouse and the roll support portion 120.

The roll support portion 120 may be disposed adjacent to the roll unwinder 10 and may be fixed to a bottom surface. For example, the roll support portion 120 may be disposed on one end of the first traveling rail 130 and may temporarily store the used roll. Specifically, the roll attaching and detaching unit 170 may detach the used roll from the roll unwinder 10 and may dispose the roll on the roll support portion 120. The mounted roll may move upwardly when the automatic conveying carrier 110 enters the apparatus 100 for loading and unloading a roll, and the roll may be disposed on an upper end of the roll support portion 120. To this end, the roll support portion 120 may be configured to include a support frame 122, a guide member 124, and a lifting unit 126 as illustrated in in FIGS. 2 and 3.

Figure 2:
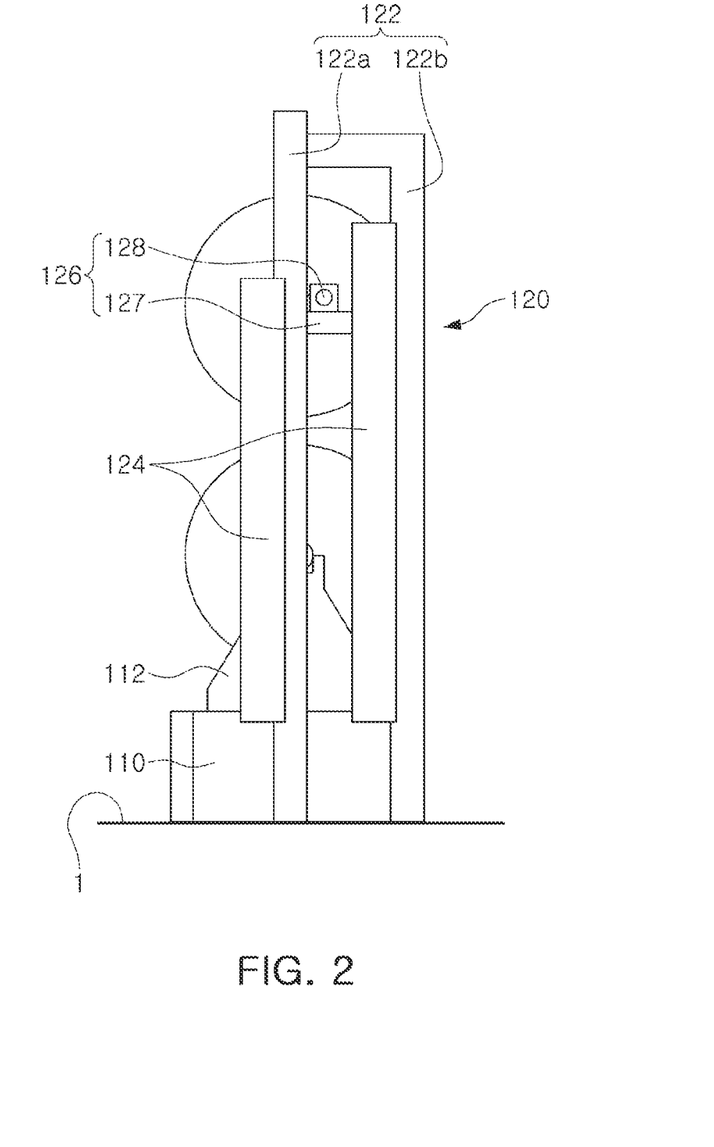
FIG. 2 is a diagram illustrating a roll support portion of an apparatus for loading and unloading a roll according to an example embodiment of the present disclosure, viewed from the front.
Figure 3:
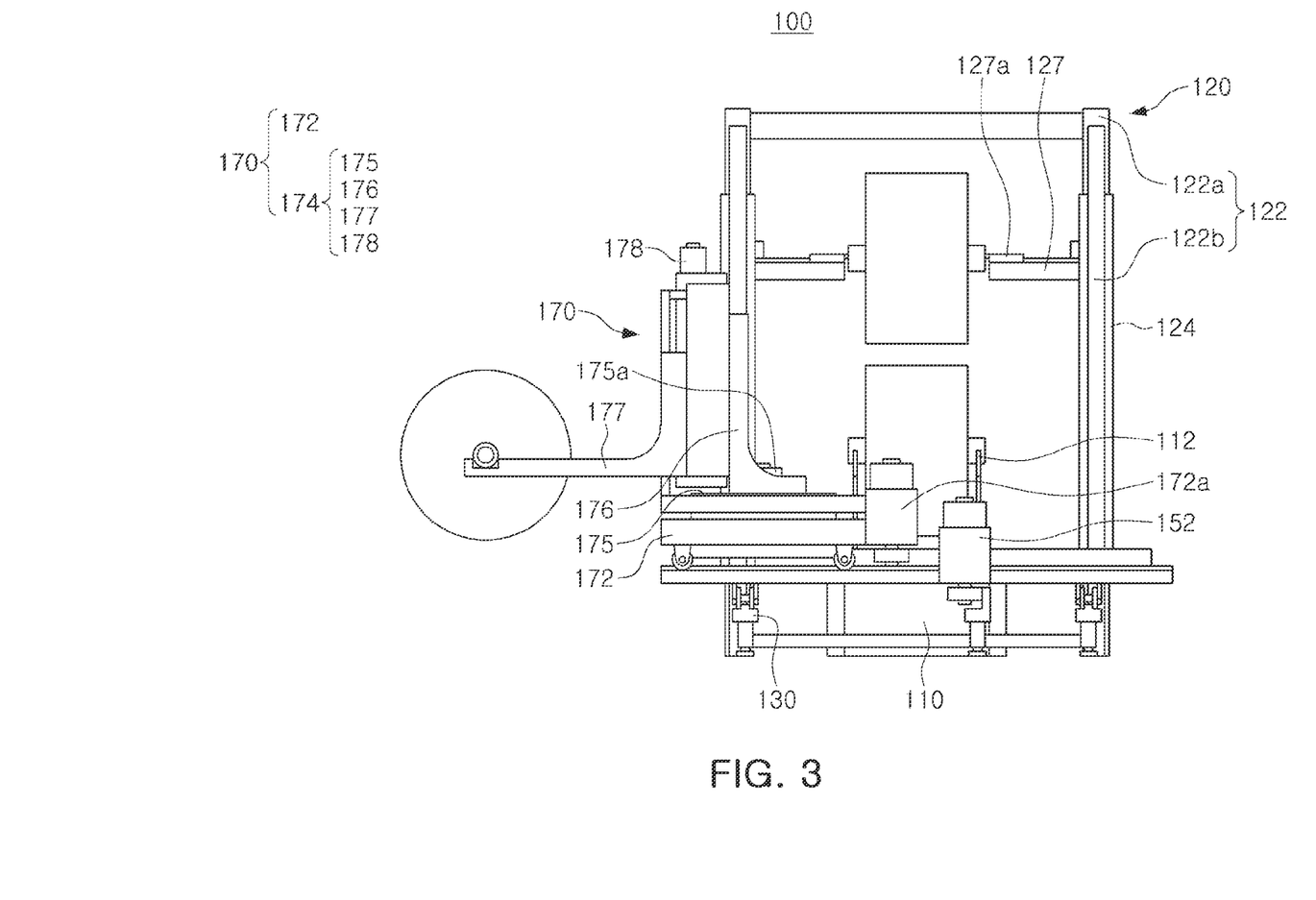
FIG. 3 is a diagram illustrating a roll support portion of an apparatus for loading and unloading a roll according to an example embodiment of the present disclosure, viewed from the side.

The support frame 122 may be fixedly installed on a bottom surface 1. The support frame 122 may include a main frame 122a and an auxiliary frame 122b spaced apart from the main frame 122a by a predetermined distance. Also, an upper end of the auxiliary frame 122b may be connected to the main frame 122a.

The guide member 124 may be installed on the support frame 122. For example, the guide member 124 may be installed in the main frame 122a and the auxiliary frame 122b, and the lifting unit 126 may be lifted along the guide member 124.

The lifting unit 126 may include a lifting arm 127 moving up and down along the guide member 124, and a lifting driving source 128 installed on the lifting arm 127 and providing a driving force to be lifted along the guide member 124.

The used roll may be disposed on the lifting arm 127. To this end, the lifting arm 127 may include a clamp 127a for placing the roll. The clamps 127a may be spaced apart from each other or may be disposed adjacent to each other and may clamp the roll. The lifting driving source 128 may be connected to a power transmission member provided in the auxiliary frame 122b and may provide the driving force to move up and down the lifting arm 127.

Figure 4:
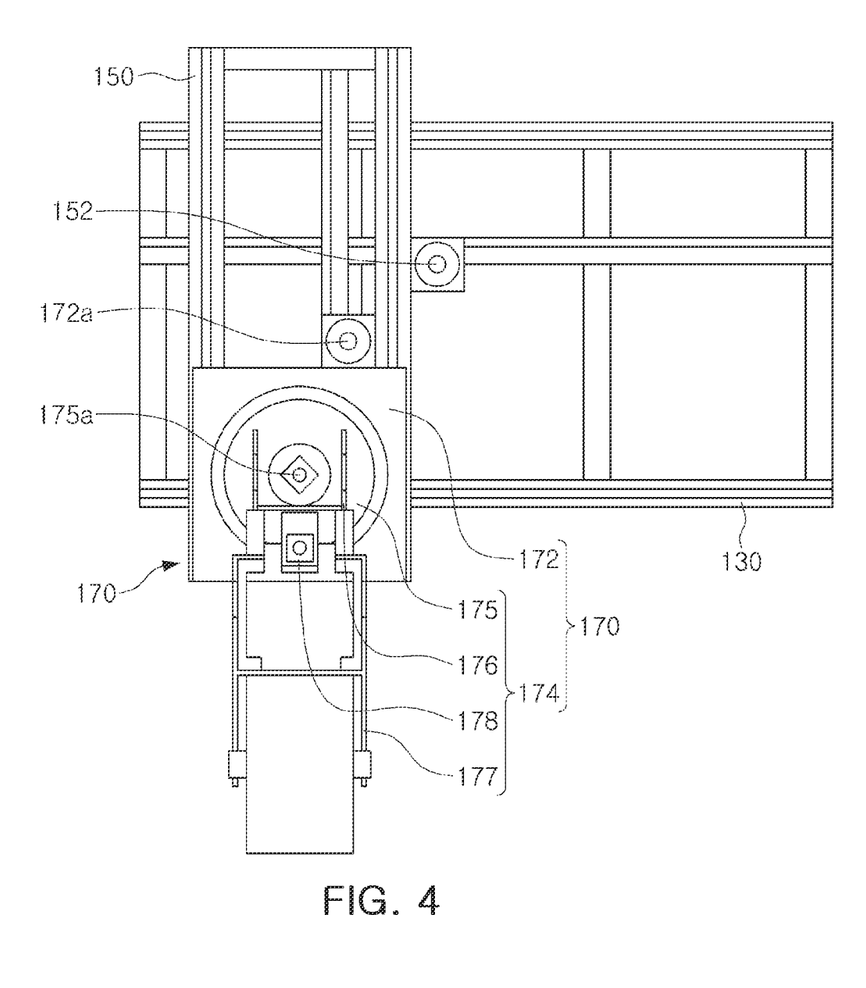
FIG. 4 is a plan diagram illustrating a first traveling rail and a moving frame of an apparatus for loading and unloading a roll according to an example embodiment of the present disclosure.

The first traveling rail 130 may be disposed on one side of the roll unwinder 10. For example, the first traveling rail 130 may be disposed on the front side of the roll support portion 120. Also, the first traveling rail 130 may be disposed side by side with the roll unwinder 10. The first traveling rail 130 may be fixedly installed on the bottom surface, and as illustrated in FIG. 4, the first traveling rail 130 may guide the movement of the moving frame 150, which will be described later. Accordingly, the roll attaching and detaching unit 170 installed on the moving frame 150 may move together with the moving frame 150.

The moving frame 150 may be movably installed on the first traveling rail 130. For example, as illustrated in FIG. 4, the moving frame 150 may include a first driving source 152 connected to the first traveling rail 130 such that the moving frame 150 may move along the first traveling rail 130. The first driving source 152 may be installed on the first traveling rail 130 via a power transmission member. The moving frame 150 may have a quadrangular frame shape, for example.

Figure 5:
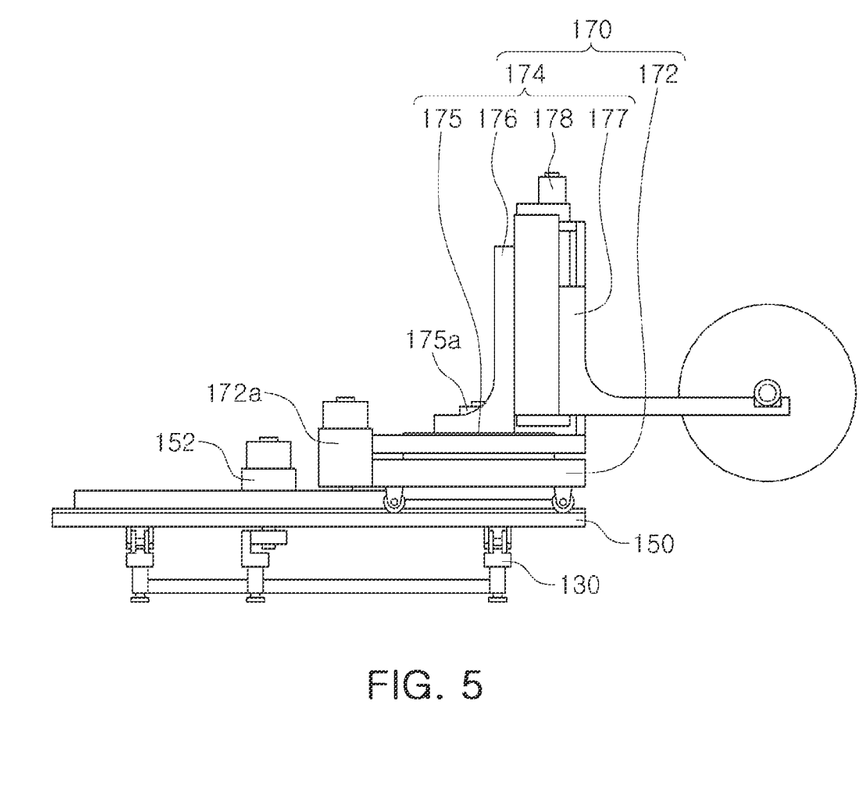
FIG. 5 is a diagram illustrating a roll attaching and detaching unit of an apparatus for loading and unloading a roll according to an example embodiment of the present disclosure, viewed from the side.

The roll attaching and detaching unit 170 may be movably and rotatably installed in the moving frame 150. For example, the roll attaching and detaching unit 170 may include a moving plate 172 moving on the moving frame 150, and a main body portion 174 rotatably installed on the moving plate 172.

The moving plate 172 may have a rectangular plate shape, and may move along the moving frame 150. To this end, the moving plate 172 may include a second driving source 172a connected to the moving frame 150 so as to move along the moving frame 150 as illustrated in FIG. 4. For example, the second driving source 172a may be installed in the moving frame 150 via a power transmission member.

Figure 8:
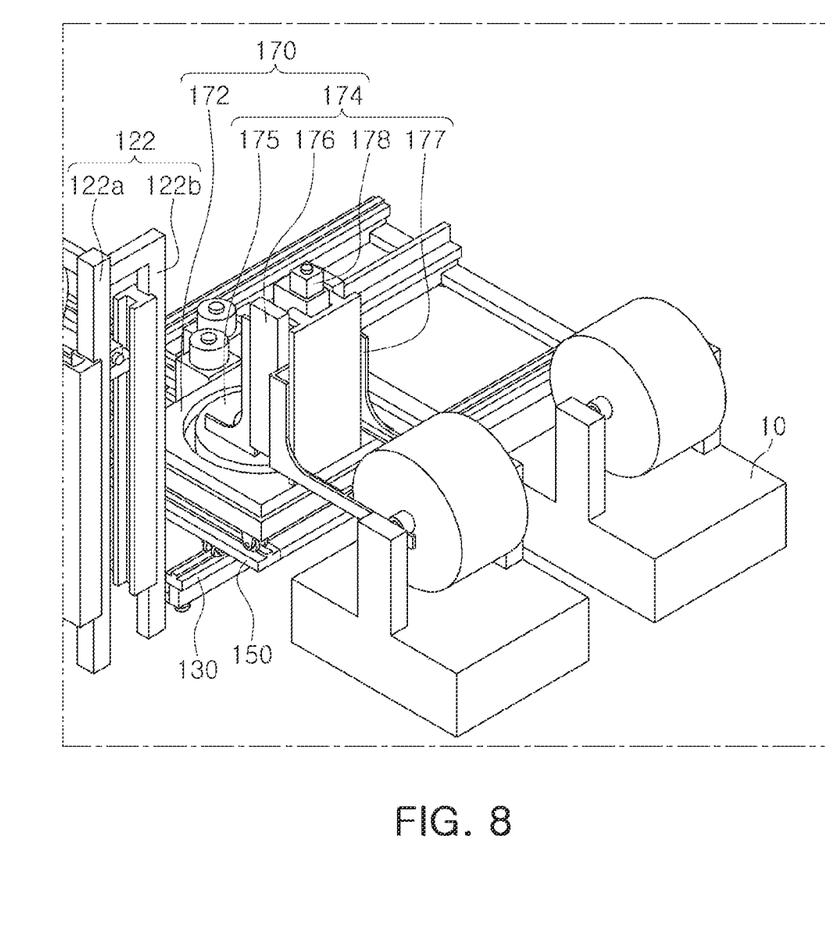
FIG. 8 is a perspective diagram illustrating a roll attaching and detaching unit of an apparatus for loading and unloading a roll according to an example embodiment of the present disclosure.

The main body 174 may include a rotating plate 175 rotatably installed on the moving plate 172, a support 176 extending upwardly from the rotating plate 175, a detachable fork 177 installed on the support stand 176 to move up and down, and a fork driving source 178 connected to the detachable fork 177 and moving up and down the detachable fork 177.

For example, the rotating plate 175 may be connected to a rotating driving source 175a for rotating driving.

As for operation of the roll attaching and detaching unit 170, when it is necessary to replace the used roll from the roll unwinder 10, the roll attaching and detaching unit 170 may be disposed on one side of the roll unwinder 10 which may need to be replaced. Thereafter, the rotating plate 175 installed on the moving plate 172 may rotate, and the detachable fork 177 may separate the roll installed on the roll unwinder 10 from the roll unwinder 10. Thereafter, the detachable fork 177 may move up and down by the fork driving source 178 and the moving plate 172 may move, such that the used roll may be spaced apart from the roll unwinder 10. Thereafter, after the moving frame 150 moves, the rotating plate 175 may rotate such that the used roll may move toward the roll support portion 120. Thereafter, the used roll may be disposed on the roll support portion 120 as the detachable fork 177 moves up and down.

Thereafter, the roll attaching and detaching unit 170 may install the roll transferred by the automatic conveying carrier 110 to the roll unwinder 10. That is, after the detachable fork 177 unloads the roll from the automatic conveying carrier 110, the moving frame 150 may move along the first traveling rail 130. Thereafter, the rotating plate 175 may rotate such that the detachable fork 177 may be directed to the roll unwinder 10. Thereafter, the moving plate 172 may move along the moving frame 150 and the detachable fork 177 may move up and down such that the roll may be loaded into the roll unwinder 10.

As described above, as the roll may be detached from and attached to the roll unwinder 10 by the roll attaching and detaching unit 170 movably installed around the roll unwinder 10 and the roll support portion 120 fixedly installed around the roll attaching and detaching unit 170, the roll may be detached from the roll unwinder 10 without an operator.

Accordingly, material defects and operator accidents caused by the roll falling may be prevented.

Hereinafter, operations of the apparatus for loading and unloading a roll according to an example embodiment will be described with reference to the drawings.

Figure 6:
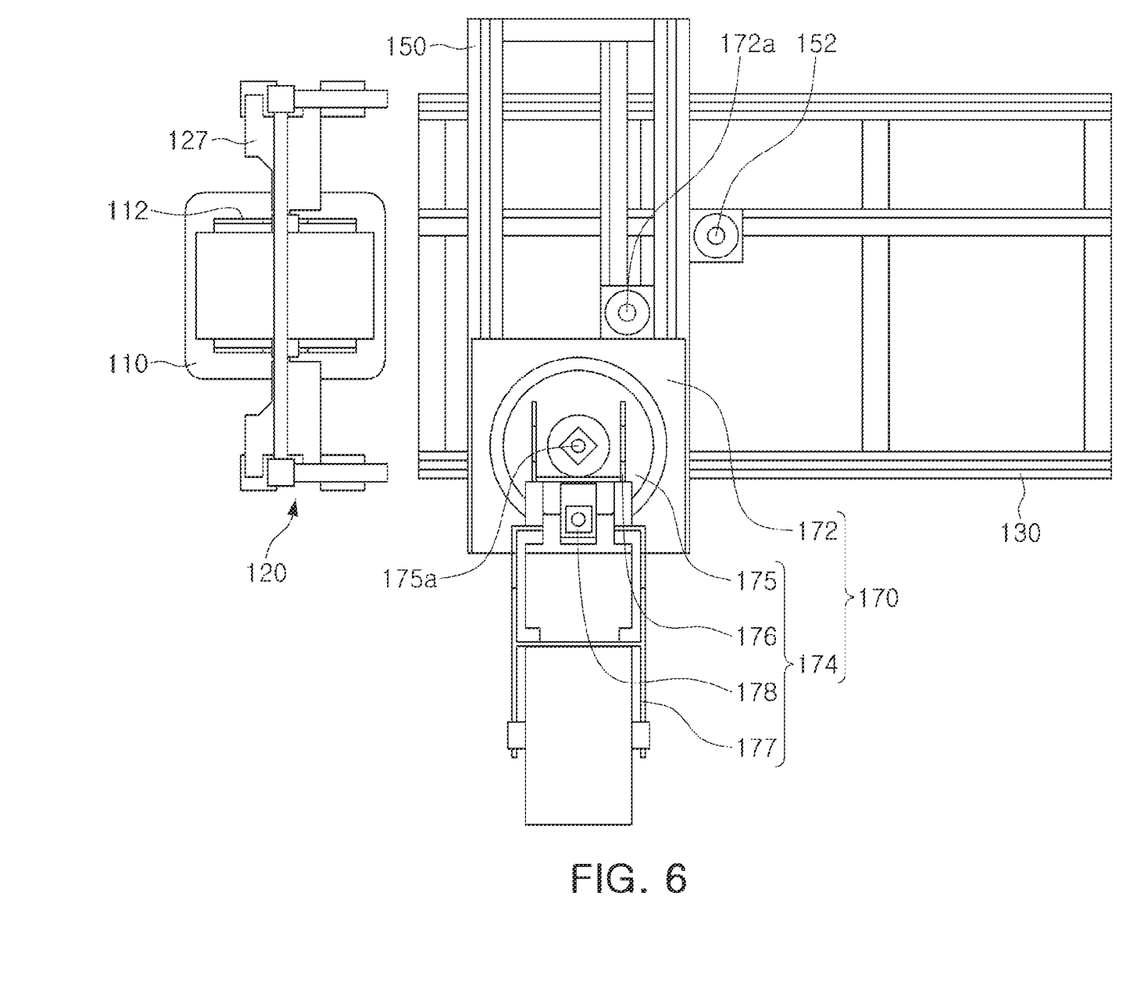
FIG. 6 is a plan diagram illustrating an apparatus for loading and unloading a roll according to an example embodiment of the present disclosure.
Figure 7:
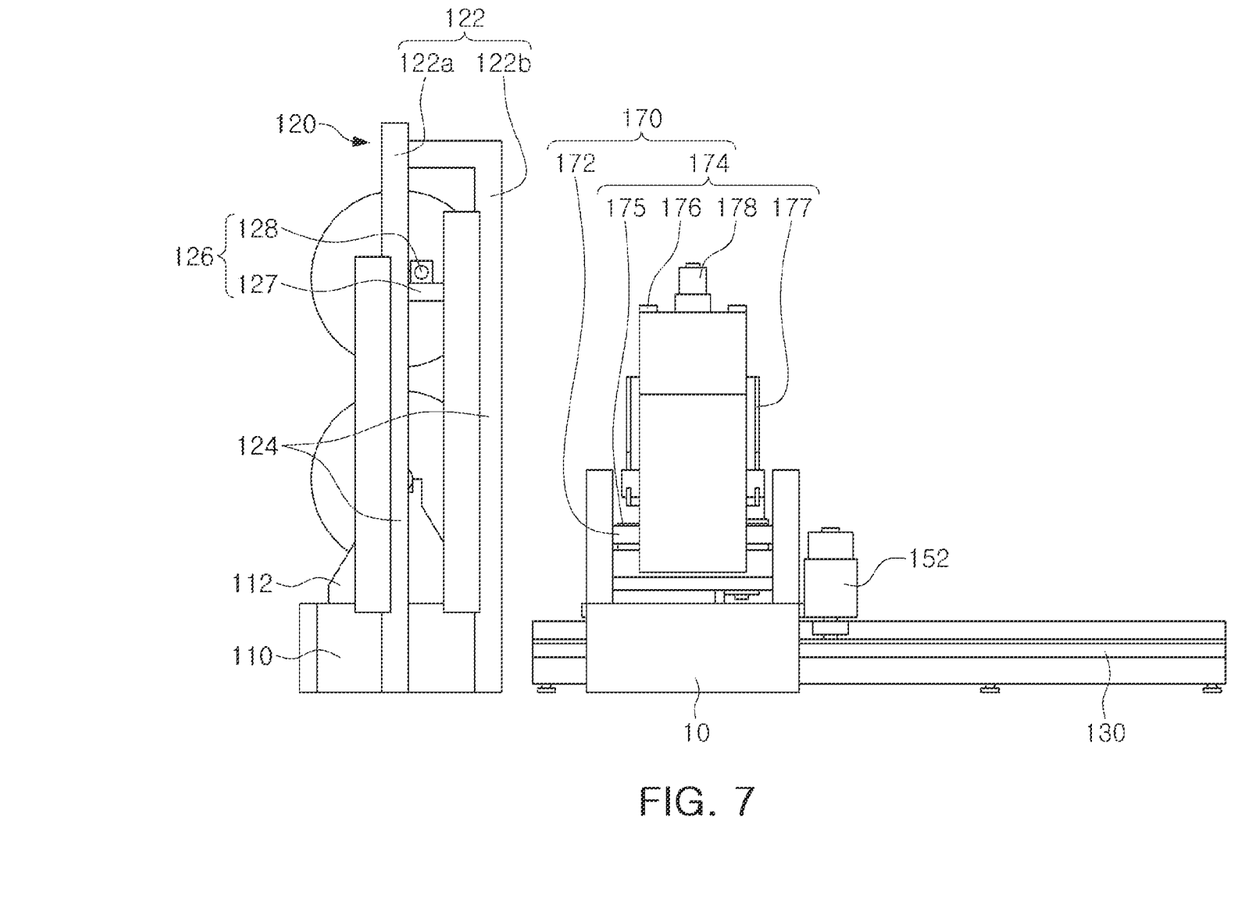
FIG. 7 is a diagram illustrating an apparatus for loading and unloading a roll according to an example embodiment of the present disclosure, viewed from the front.

When it is necessary to replace the used roll from the roll unwinder 10, the moving frame 150 may move along the first traveling rail 130 and the moving plate 172 of the roll attaching and detaching unit 170 may move along the moving frame 150. Accordingly, the moving plate 172 of the roll attaching and detaching unit 170 may be disposed on one side of the roll unwinder 10.

Thereafter, the rotating plate 175 may rotate and the detachable fork 177 may be disposed in a direction toward the roll unwinder 10. Thereafter, in a state in which the detachable fork 177 moves down, the moving plate 172 may move along the moving frame 150, and the detachable fork 177 may load the used roll installed on the roll unwinder 10.

Thereafter, the moving plate 172 may move to be spaced apart from the roll unwinder 10 along the moving frame 150. Thereafter, the moving frame 150 may move along the first traveling rail 130 so as to be spaced apart from the roll support portion 120 to form a space for rotation of the rotating plate 175.

Thereafter, the rotating plate 175 may rotate and the detachable fork 177 may be disposed in a direction toward the roll support portion 120. Thereafter, the moving plate 172 may move along the moving frame 150 such that the detachable fork 177 may move to a position in which the used roll may be loaded onto the roll support portion 120.

Thereafter, the moving frame 150 may move along the first traveling rail 130 such that the detachable fork 177 may enter the roll support portion 120. When the entry of the detachable fork 177 into the roll support portion 120 is completed, the clamp 127a of the lifting arm 127 may move and may clamp the used roll. Thereafter, the lifting arm 127 may move up such that the used roll may be disposed on an upper portion of the roll support portion 120.

Thereafter, the moving frame 150 may move along the first traveling rail 130 such that the detachable fork 177 may be spaced apart from the roll support portion 120.

Thereafter, the automatic conveying carrier 110 may enter a lower end of the roll support portion 120 with a new roll. In this case, the automatic conveying carrier 110 may be disposed below the position of the used roll.

Thereafter, the moving frame 150 may move along the first traveling rail 130 to a portion in which the detachable fork 177 may load a new roll from the automatic conveying carrier 110.

Thereafter, a new roll may be loaded on the detachable fork 177 as the detachable fork 177 moves up. When a new roll is loaded on the detachable fork 177, the moving frame 150 may move along the first traveling rail 130 such that the detachable fork 177 may be spaced apart from the roll support portion 120 and the detachable fork 177 may be disposed on one side. Thereafter, the rotating plate 175 may rotate and the detachable fork 177 may be disposed in a direction toward the roll unwinder 10. Thereafter, the moving plate 172 may move along the moving frame 150 such that the detachable fork 177 may move to a position in which a new roll may be unloaded from the roll unwinder 10. Thereafter, a new roll may be unloaded from the roll unwinder 10 as the detachable fork 177 moves down.

After a new roll is loaded onto the automatic conveying carrier 110, and more specifically onto the roll attaching and detaching unit 170, the used roll disposed on the roll support portion 120 may be unloaded from the automatic conveying carrier 110. Specifically, after a new roll is unloaded from the roll unwinder 10, the moving plate 172 may move along the moving frame 150 to be spaced apart from the roll unwinder 10. Thereafter, the moving frame 150 may move along the first traveling rail 130 so as to be spaced apart from the roll support portion 120 to form a space for rotation of the rotating plate 175.

Thereafter, the rotating plate 175 may rotate and the detachable fork 177 may be disposed in a direction toward the roll support portion 120. Thereafter, the moving plate 172 may move along the moving frame 150 such that the detachable fork 177 may move to a position in which the used roll may be loaded onto the roll support portion 120.

Thereafter, the lifting arm 127 may move upwardly and may be held such that the automatic conveying carrier 110 may enter with a new roll, the new roll may be loaded onto the detachable fork 177, the lifting arm 127 may move down, and the used roll may be loaded to the automatic conveying carrier 110.

Thereafter, the automatic conveying carrier 110 may transfer the used roll to a warehouse.

As described above, the roll may be attached to and detached from the roll unwinder 10 through the roll support portion 120 fixedly installed around the roll attaching and detaching unit 170 and the roll unwinder 10 installed movably around the roll unwinder 10, such that the roll may be attached to and detached from the roll unwinder 10 without an operator.

Accordingly, material defects and operator accidents due to a roll falling may be prevented.

According to the aforementioned example embodiments, an effect of the apparatus is that the roll may be conveyed and loaded without an operator.

Also, material defects and operator accidents due to the roll falling may be prevented. While only an example embodiment has been illustrated and described above, it will be apparent to those skilled in the art that modifications and variations could be made without departing from the scope of the present invention as defined by the appended claims.

What is claimed is:

1. An apparatus for loading and unloading a roll, comprising:
    a roll support portion disposed adjacent to a roll unwinder;
    a first traveling rail disposed on one side of the roll unwinder;
    a moving frame movably installed on the first traveling rail; and
    a roll attaching and detaching unit movably installed on the moving frame,
    wherein the roll support portion includes a lifting unit configured to move up and down a disposed roll, and
    wherein the roll attaching and detaching unit includes a moving plate moving on the moving frame, and a main body portion rotatably installed on the moving plate.

2. The apparatus of claim 1,
    wherein the roll support portion includes a support frame extending upwardly from a bottom surface and a guide member installed on the support frame, and
    wherein the lifting unit is connected to the guide member.

3. The apparatus of claim 2, wherein the lifting unit includes a lifting arm configured to move up and down on the guide member, and a lifting driving source installed on the lifting arm configured to provide a driving force for the lifting arm to move up and down along the guide member.

4. The apparatus of claim 3, wherein the lifting arm includes a clamp movably installed for clamping the roll.

5. The apparatus of claim 1, wherein the first traveling rail is disposed side by side with the roll unwinder.

6. The apparatus of claim 5, wherein a plurality of the roll unwinders are spaced apart from each other along the first traveling rail.

7. The apparatus of claim 5, wherein the moving frame is disposed to intersect the first traveling rail.

8. The apparatus of claim 1, wherein the moving frame includes a first driving source connected to the first traveling rail such that the moving frame is able to move along the first traveling rail.

9. The apparatus of claim 1, wherein the moving plate includes a second driving source connected to the moving frame such that the moving plate is able to move along the moving frame.

10. The apparatus of claim 1, wherein the main body portion includes a rotating plate rotatably installed on the moving plate, a support stand extending upwardly from the rotating plate, a detachable fork installed on the support stand to move up and down, and a fork driving source connected to the detachable fork and moving up and down the detachable fork.

11. The apparatus of claim 1, further comprising:
an automatic conveying carrier configured to move the roll.

12. The apparatus of claim 11, wherein the automatic conveying carrier includes a seating stand for loading the roll on an upper surface thereof.

13. An apparatus for loading and unloading a roll, the apparatus comprising:
a roll support portion disposed adjacent to a roll unwinder;
a first traveling rail disposed on one side of the roll unwinder;
a moving frame movably installed on the first traveling rail; and
a roll attaching and detaching unit movably installed on the moving frame,
wherein the roll support portion includes a lifting unit configured to move up and down a disposed roll, a support frame extending upwardly from a bottom surface and a guide member installed on the support frame,
wherein the roll attaching and detaching unit includes a moving plate moving on the moving frame, and a main body portion rotatably installed on the moving plate, and wherein the lifting unit is connected to the guide member.

* * * * *